United States Patent [19]

Iwasaki

[11] Patent Number: 5,186,071
[45] Date of Patent: Feb. 16, 1993

[54] BICYCLE SPEED CHANGE LEVER ASSEMBLY

[75] Inventor: Yoshihisa Iwasaki, Osaka, Japan
[73] Assignee: Maeda Industries, Ltd., Osaka, Japan
[21] Appl. No.: 773,906
[22] PCT Filed: Mar. 8, 1991
[86] PCT No.: PCT/JP91/00315
  § 371 Date: Nov. 4, 1991
  § 102(e) Date: Nov. 4, 1991
[87] PCT Pub. No.: WO91/13797
  PCT Pub. Date: Sep. 19, 1991

[30] Foreign Application Priority Data

Mar. 9, 1990 [JP] Japan .................. 2-24020
  Mar. 26, 1990 [JP] Japan .................. 2-31700

[51] Int. Cl.⁵ .................................. G05G 5/06
[52] U.S. Cl. .......................... 74/489; 74/475; 74/502.2
[58] Field of Search ................ 74/489, 475, 502.2

[56] References Cited

U.S. PATENT DOCUMENTS

| | | | |
|---|---|---|---|
| 4,343,201 | 8/1982 | Shimano | 74/475 |
| 4,995,280 | 2/1991 | Tagawa | 74/475 X |
| 5,012,692 | 5/1991 | Nagano | 74/489 X |
| 5,094,120 | 3/1992 | Tagawa | 74/502.2 |

FOREIGN PATENT DOCUMENTS 59-24621 7/1984 Japan .
62-38878 10/1987 Japan .
1-41678 12/1989 Japan .

Primary Examiner—Leslie A. Braun
Assistant Examiner—Nicholas Whitelaw
Attorney, Agent, or Firm—Marks & Murase

[57] ABSTRACT

A bicycle speed change lever assembly comprises a tubular body (7) pivotally supported on a lever shaft (9) which is located inwardly and downwardly relative to an end grip portion (2) of a handlebar (1) and extends downward, and a control arm (8) extending radially outward from the tubular body. The following measure is taken for enabling speed change operation while gripping the grip portion (2) of the handlebar (1), for enlarging the pivotal range of the control arm (8) to increase the number of speed stages, and for enabling smooth pivotal operation of the control arm (8). The control arm (8) has a first operating arm portion (13) which provides a pivotal path immediately under the handlebar (1) or grip portion (2), and a second operating arm portion (14) which provides a pivotal path spaced from the underside of the handlebar (1) or grip portion (2) by a predetermined distance.

20 Claims, 14 Drawing Sheets

BICYCLE SPEED CHANGE LEVER ASSEMBLY

TECHNICAL FIELD

This invention relates to a bicycle speed change lever assembly. More specifically, the present invention relates to a bicycle speed change lever assembly which is capable of increasing the number of selectable speed stages by expanding the pivotal range of a control arm of the lever assembly and in which the control arm can be pivotally operated safely and smoothly.

BACKGROUND OF THE INVENTION

Conventionally, a bicycle speed change lever assembly is mounted at a portion of the bicycle frame or handlebar. Due to such an arrangement, the rider trying to perform a speed change operation needs to remove one hand from a grip portion of the handlebar while assuming a one-hand riding condition. In addition, when the rider encounters a situation which requires sudden braking or avoidance of a road projection or depression while performing a speed change operation, a certain time after the recognition of such a situation is required before actually bringing the hand to the brake or handlebar. Thus, the conventional arrangement is not considered to provide safety in performing speed change.

To solve the above problem, speed change lever assembly has been proposed which is mounted close to a grip portion of the handlebar for enabling a speed change operation while grasping the grip portion, as disclosed in Japanese Utility Model Publication 59-24621.

However, the speed change lever assembly disclosed in the above publication has a control arm located above the handlebar, so that the thumb or forefinger grasping the grip portion must be moved to a position above the handlebar. While it is not necessary to remove all fingers from the grip portion, the need to remove the most forcefully gripping thumb or forefinger from the grip portion results in insufficient enhancement of the operability and safety of the lever assembly.

Particularly, with the so-called mountain bicycle designed to run off-road, it is desirable for the rider to use the thumb and forefinger for gripping the handlebar even at the time of performing a speed change in view of the fact that the bicycle must always run on severely rough grounds.

As a solution to this problem, there has been developed a bicycle speed change lever assembly which incorporates a bifurcated pair of operating arm portions located adjacent and under a handlebar grip portion and extending on both sides of the grip portion, as disclosed in Japanese Utility Model Publication No. 62-38878 for example. According to the arrangement of this publication, the rider extends the thumb and forefinger downwardly with the handlebar grip portion held therebetween, and the bifurcated pair of arm portions may be pivoted horizontally by the extended thumb and forefinger. Thus, the thumb and forefinger need not be brought out of gripping engagement with the grip portion at the time of performing a speed change operation, thereby greatly improving the safety.

However, with the speed change lever assembly of the latter publication, it is impossible to provide a large pivotal angle for the operating arm portions. Thus, the lever assembly is problematic in the inability of providing five to eight speed stages which are normally required for sports-type bicycles.

More specifically, with the lever assembly of the latter publication, the bifurcated pair of operating arm portions are located on both sides of the handlebar, and the rider gripping the handlebar extends the thumb and forefinger downwardly to pivot the arm portions within the range defined between the thumb and forefinger. Therefore, the pivotal range for the arm portions is limited by the thumb and forefinger extended from the handlebar. As a result, the pivotal range for the arm portions becomes small, thus failing to provide a required number of speed stages for a normal sports-type bicycle.

Further, the bifurcated pair of operating arm portions disclosed in the latter publication are identical in length and pivoted in the same plane. Thus, it is difficult to effectively utilize the movable ranges of the thumb and forefinger for pivotal operation.

Specifically, the thumb and forefinger are different in length and movable range so that the optimum pivotal path of the operating arm portions for the thumb does not coincide with that for the forefinger. Thus, the operating arm portions, if optimized in pivotal path for one of the thumb and forefinger, cannot be conveniently operated by the other.

Further, the operating arm portions need be relatively long to effectively utilize the movable range of the thumb and forefinger and to increase the pivotal range of the arm portions. However, since the respective arm portions are designed to pivot in the same plane, they interfere with the fingers grasping the grip portion during a speed change operation, thereby hindering the speed change operation. Due to this, the pivotal range of the operating arm portions is additionally limited, which is an obstacle in increasing the number of speed stages.

DISCLOSURE OF THE INVENTION

It is, therefore, an object of the present invention is to provide a bicycle speed change lever assembly incorporating a control arm which can be pivoted in a wide range for increasing the number of speed stages and which can be pivotally operated very smoothly.

Another object of the present invention is to provide a bicycle speed change lever assembly which can be operated safely for performing speed change.

The bicycle speed change lever assembly according to the present invention comprises a tubular body pivotally supported on a lever shaft which is located inwardly and downwardly relative to an end grip portion of a handlebar and extends downward, and a control arm extending radially outward from the tubular body, wherein characterized in that:

the control arm has a first operating arm portion which provides a pivotal path immediately under the handlebar or grip portion, and a second operating arm portion which provides a pivotal path spaced from the underside of the handlebar or grip portion by a predetermined distance.

Other objects, features and advantages of the present invention will become apparent from the preferred embodiments described below with reference to the accompanying drawings.

BRIEF DESCRIPTION OF THE DRAWINGS

FIGS. 1 through 8 show a first embodiment of the present invention, wherein:

FIG. 1 is a plan view showing a speed change lever according to the first embodiment as mounted to the straight handlebar of a so-called mountain bicycle;

FIG. 2 is a view showing the lever assembly of FIG. 1 as seen from behind the bicycle; and FIGS. 3 to 8 are views illustrating how the lever assembly of FIG. 1 is operated.

FIGS. 9 through 14 show a second embodiment of the present invention, wherein:

FIG. 9 is a plan view showing a speed change lever according to the second embodiment as mounted to the straight handlebar of a so-called mountain bicycle;

FIG. 10 is a view showing the lever assembly of FIG. 9 as seen from behind the bicycle (in the arrow X direction);

FIG. 11 is a side view showing the mounting condition of the lever assembly as seen axially of the handlebar (in the arrow Y direction); and FIGS. 12 to 14 are schematic views illustrating the operation of the lever assembly according to the second embodiment.

BEST MODE FOR CARRYING OUT THE INVENTION

The best mode for carrying out the present invention is specifically described with reference to FIGS. 1 through 14.

A first embodiment of the present invention is shown in FIGS. 1 through 8.

Figure 1:
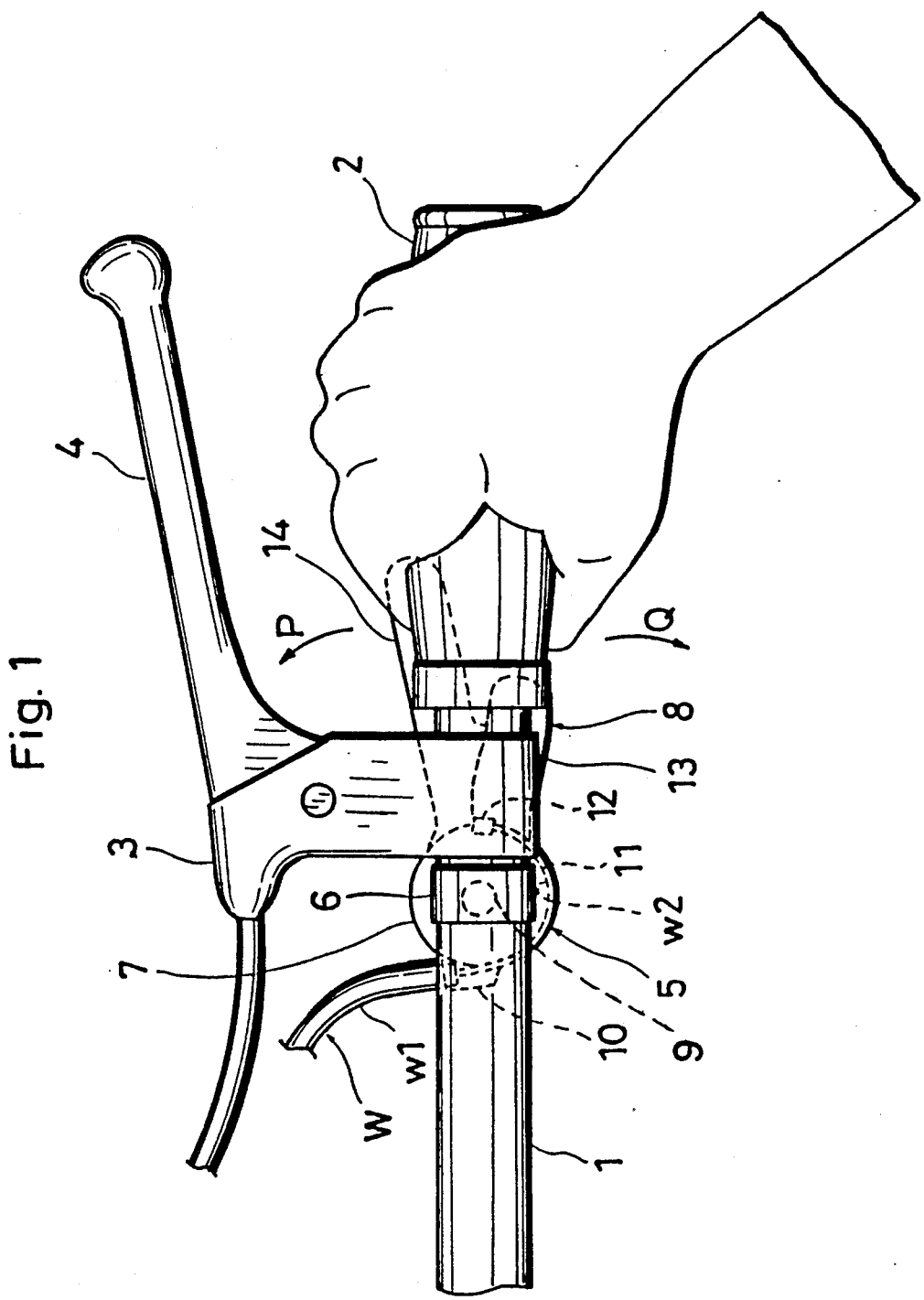
Figure 2:
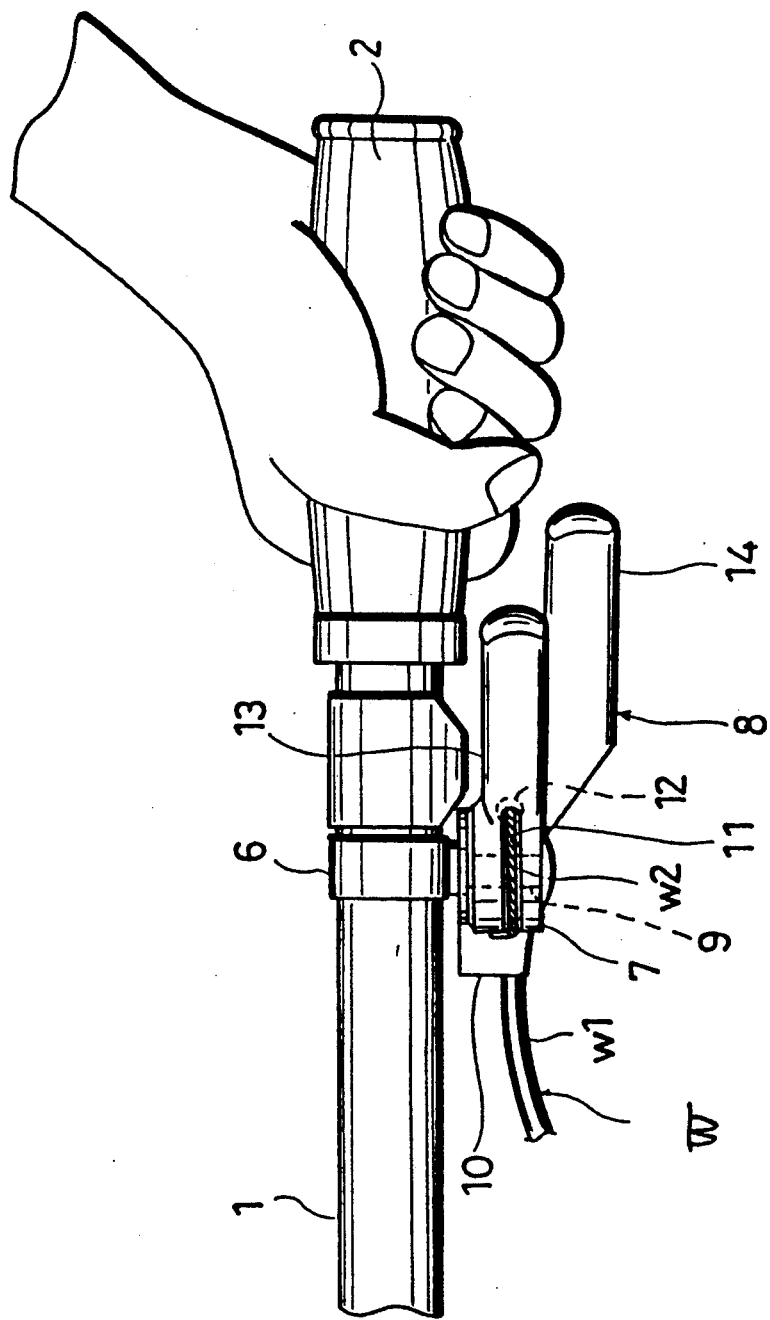

As shown in FIGS. 1 and 2, a handlebar 1 is provided, at both ends, with grip portions 2 which are coated with soft resin for example. Inwardly relative to each grip portion 2 is arranged a brake bracket 3 projecting forwardly. A brake lever 4 extends ahead of the grip portion 2 and has its base portion pivoted to the brake bracket 3.

A speed change lever assembly 5 according to the first embodiment is mounted inwardly and downwardly relative the brake bracket 3. The lever assembly includes a mounting bracket 6 fitted on the handlebar 1, a tubular body 7 rotatably supported by the handlebar 1, and a control arm 8 extending radially outward from the tubular body 7. In the first embodiment, the tubular body 7 is rotatably fitted on a lever shaft 9 which is integral with the mounting bracket 6 and extends downward under the handlebar 1. In this way, the control arm 8 together with the tubular body 7 is pivotally supported by the handlebar 1.

A control cable W extending from an unillustrated derailleur has an outer sheath w1 engaging at its one end with a sheath stopper 10 which is integral with the mounting bracket 6. On the other hand, an inner wire w2 extending through the sheath stopper 10 is wound in a wire groove 11 formed on the outer circumference of the tubular body 7, and has an end nipple 12 caught at a suitable circumferential portion of the tubular body 7. When the control arm 8 is pivotally operated, the end nipple 12 of the inner wire w2 moves rotationally with the tubular body 7, thereby drawing in and paying out the inner wire w2 relative to the outer sheath w1 caught by the sheath stopper 10. Thus, the inner wire w2 is moved axially relative to the outer cable w1, and the unillustrated derailleur is operated by such relative movement of the double cable. According to the first embodiment, when the control arm 8 is pivoted in the direction of an arrow P, the chain is shifted to a lower speed gear. Conversely, when the control arm is pivoted in the direction of an arrow Q, the chain is shifted to a higher speed gear.

As shown in FIGS. 1 and 2, the control arm 8 has a first operating arm portion 13 which provides a pivotal path immediately under the handlebar 1 and grip portion 2, and a second operating arm portion 14 which provides a pivotal path spaced from the handlebar 1 or grip portion 2 by a predetermined distance.

As better illustrated in FIG. 2, the first arm portion 13 is located inwardly relative to the finger portions engaging the underside of the grip portion 2 and provides a pivotal path immediately under the handlebar 1 or grip portion 2. Thus, the first arm portion may be pivotally operated within a horizontal plane which substantially contains the finger portions engaging the underside of the grip portion 2.

On the other hand, the second arm portion 14 extends from the tubular body 7 but offsets downwardly, so that its pivotal path is spaced from the underside of the grip portion 2 by a distance generally corresponding to the thickness of the finger portions engaging the underside of the grip portion. Further, the extending length of the second arm portion 14 is larger than that of the first arm portion 13, so that the second arm portion can be pivotally operated under the finger portions engaging the underside of the grip portion 2. Moreover, in the first embodiment, the second arm portion 14 is slightly inclined relative to the first arm portion 13 in plan view so that the former is positioned ahead of the latter, as illustrated in FIG. 1.

The operation of the speed change lever assembly 5 having the above construction is described below. FIGS. 3–8 schematically show the respective positions of the control arm 8 and fingers at the time of operating the lever assembly 5.

Figure 3:
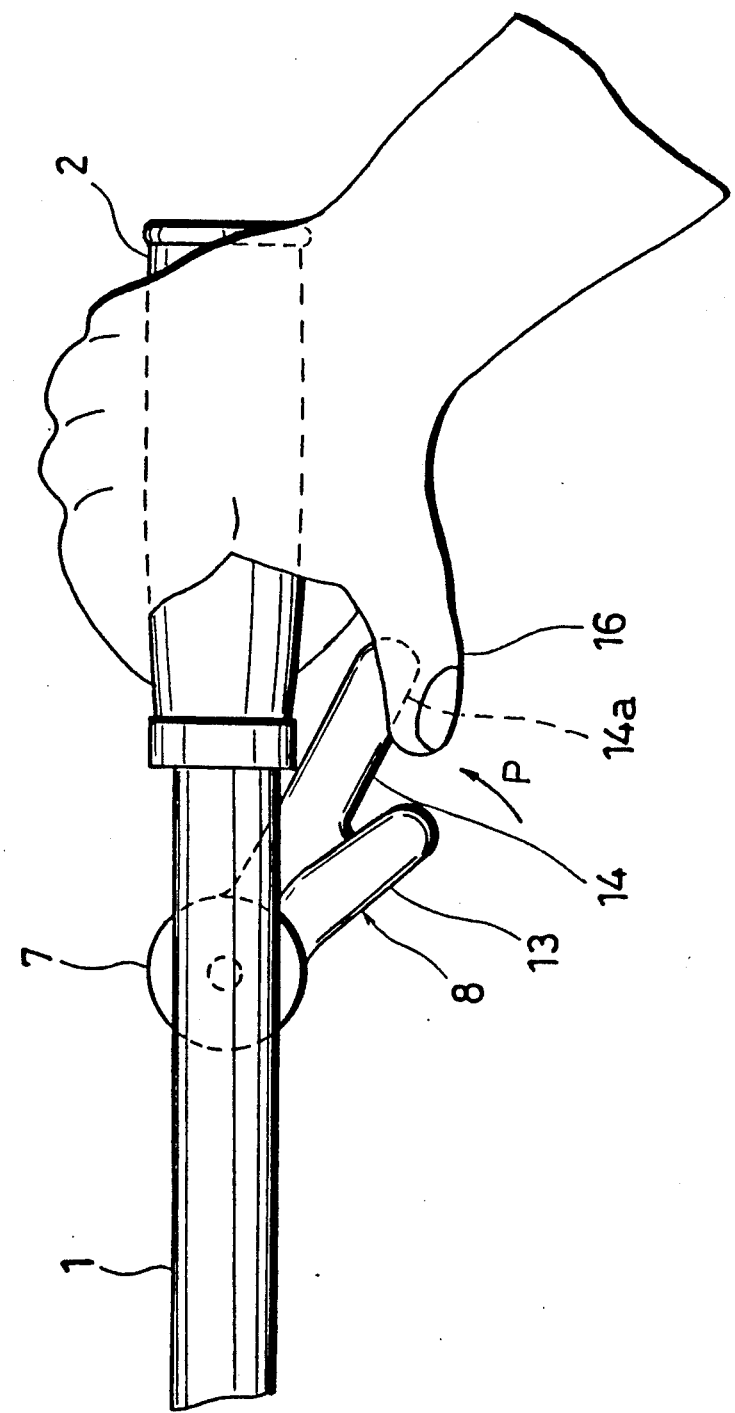
Figure 4:
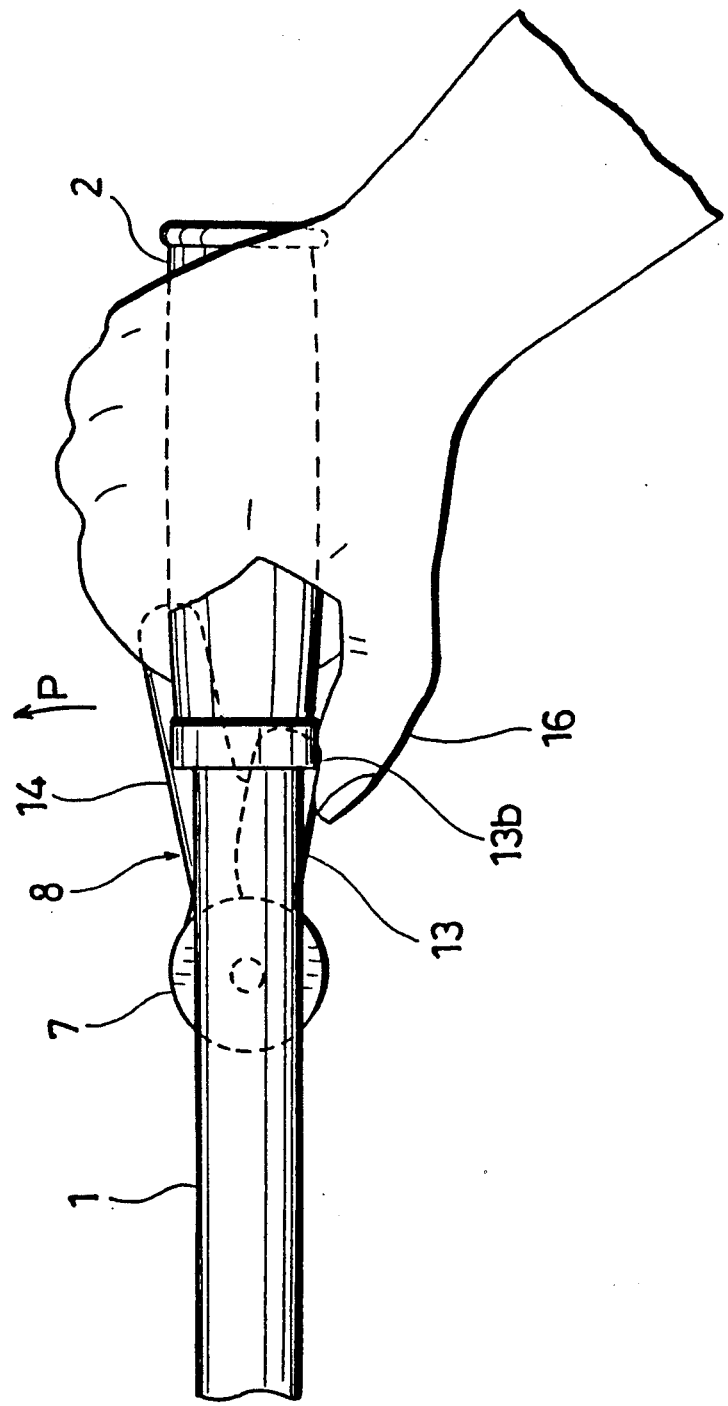
Figure 5:
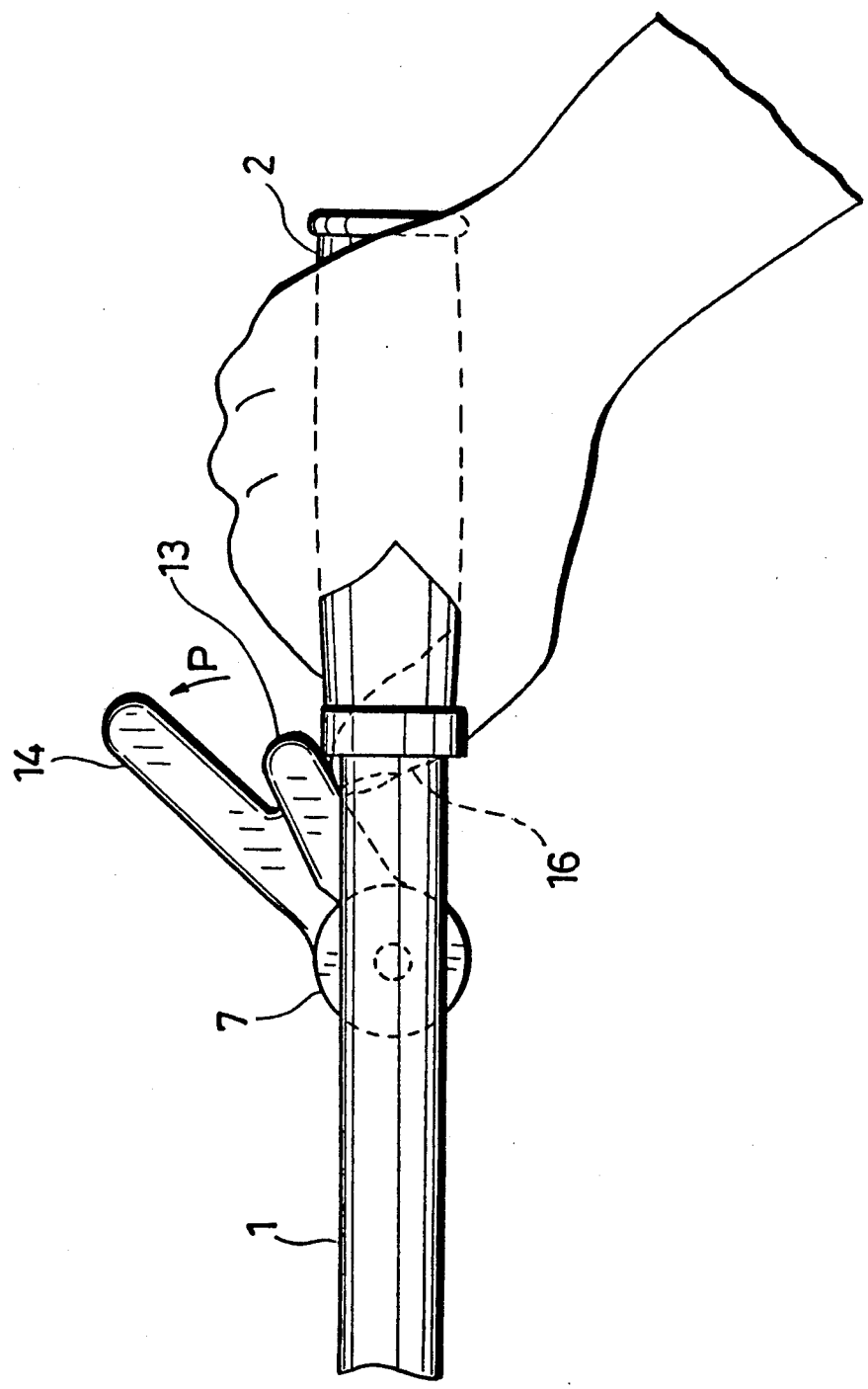

FIGS. 3–5 show the successive stages of pivoting the control arm 8 in the arrow P direction for shifting the chain from a higher speed sprocket to a lower speed sprocket. In such an operation, the thumb is mainly used for pivoting the control arm 8. As shown in FIG. 3, the control arm 8 held at its top speed pivotal position may be pivotally operated by rearwardly extending the thumb 16 for engagement with the inner side surface 14a of the second arm portion 14 and drawing the second arm portion 14 toward the grip portion 2. Since the length of the second arm portion 14 is larger than that of the first arm portion 13, the thumb 16 previously engaging the grip portion 2 may be extended in a natural condition for engagement with the inner side face 14a of the second arm portion 14, thereby enabling easy operation of the control arm even if the first arm portion 13 is inconveniently located for engagement with the thumb.

FIG. 4 shows how the control arm 8 is operated when it is located near the grip portion 2. In this condition, the first arm portion 13 has been brought close to the thumb 16. Thus, the thumb need only be extended inwardly for convenient engagement with the outer side face 13b of the first arm portion 13. For pivoting the control arm 8 maximally forward to the lowest speed pivotal position, the thumb 16 is moved forwardly beyond the grip portion 2 to pivotally push the control arm 8, as shown in FIG. 5. Since the pivotal path of the first arm portion 13 is located inwardly relative to the thumb 16 and immediately under the handlebar 1 or grip portion 2, the movable range of the thumb 16 is effectively utilized for pivoting the first arm portion 13 farther ahead of the grip portion 2. Further, since the pivotal path of the second arm portion 14 is spaced from the underside of the grip portion 2 by a predetermined distance, the second arm portion does not interfere with the other fingers gripping the grip portion 2, thereby insuring smooth pivotal operation of the control arm 8.

Figure 6:
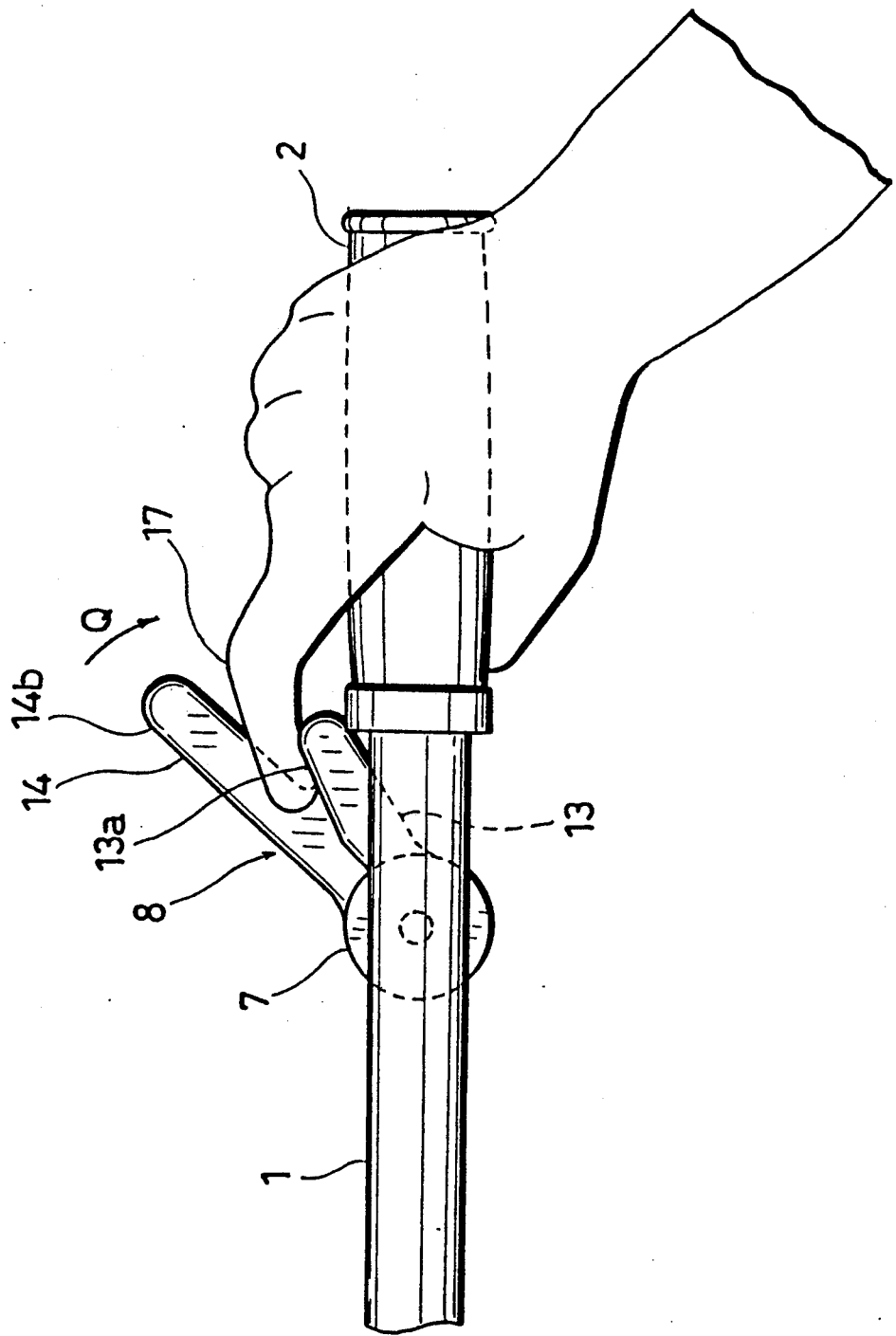
Figure 7:
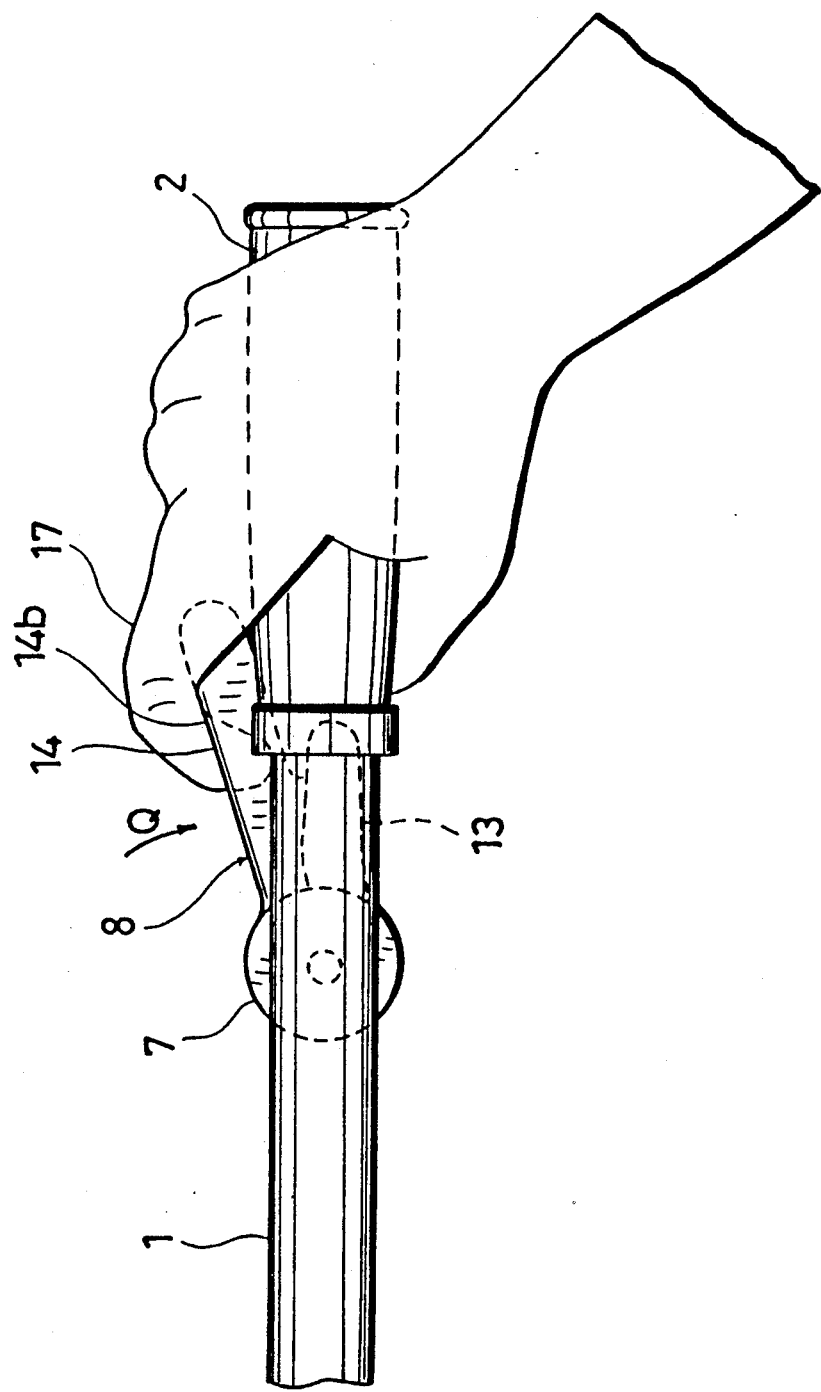
Figure 8:
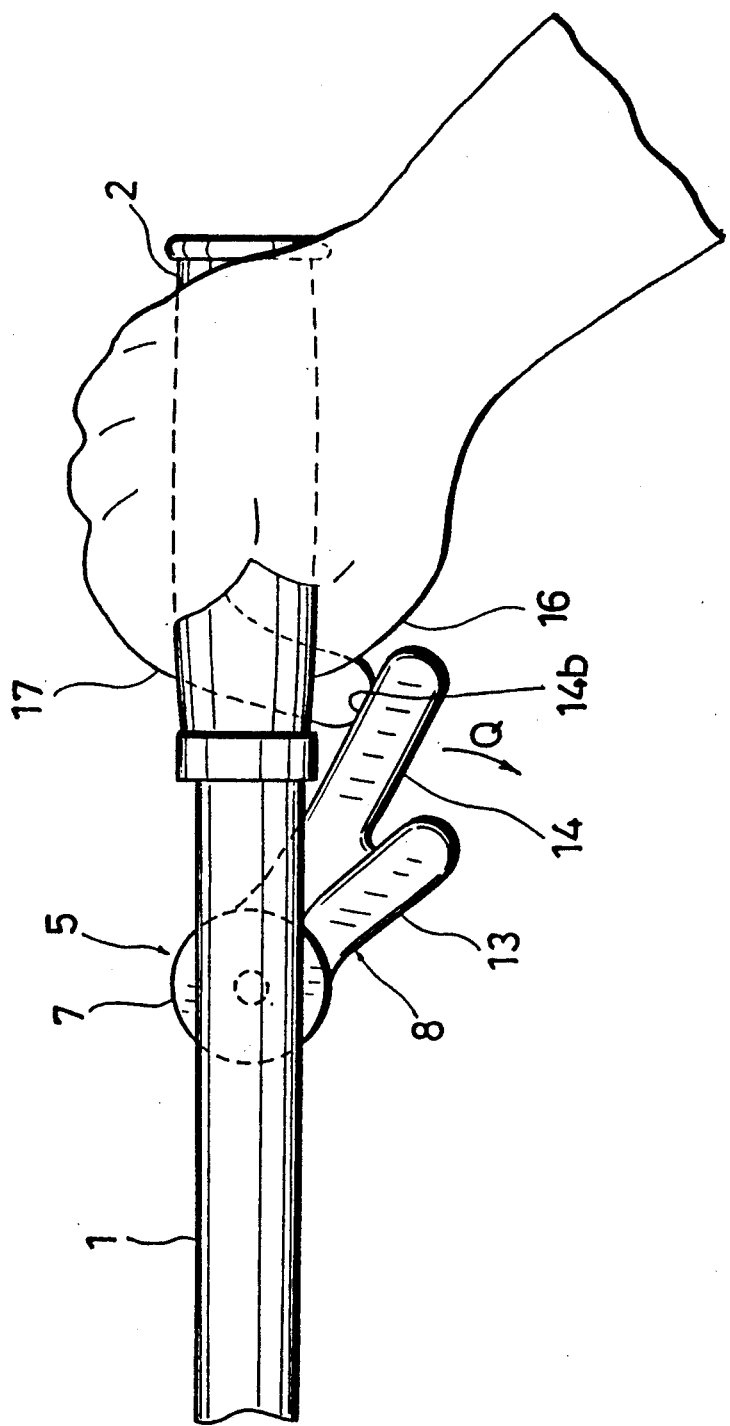

FIGS. 6-8 show how the control arm 8 is pivotally operated in the arrow Q direction to shift the chain from a lower speed sprocket to a higher speed sprocket. In such an operation, the forefinger is mainly used for pivoting the control arm 8. As shown in FIG. 6, the control arm 8 held at its lowest speed pivotal position may be pivoted in the arrow Q direction by forwardly and inwardly extending the forefinger 17 ahead of the grip portion 2 for engagement with the inner side surface 13a of the first arm portion 13 and drawing the first arm portion 13 toward the grip portion 2. Since the pivotal path of the first arm portion 13 is located immediately under the handlebar 1 and inwardly relative to the gripping fingers, the forefinger 17 may be conveniently engaged with the first arm portion for pivotal operation thereof even if the outer side face 14b of the second arm portion 14 has been forwardly pivoted too far for engagement with the forefinger.

FIG. 7 shows how the control arm 8 is operated when it is located near the grip portion 2. In this condition, the second arm portion 14 has been brought to a position near under the grip portion 2, so that the forefinger can be conveniently extended downward for engagement with the outer side face 14b of the second arm portion 14. For pivoting the control arm 8 rearward to the top speed pivotal position, the downwardly extended forefinger 17 is moved rearwardly beyond the grip portion 2 to pivotally push the control arm 8, as shown in FIG. 8. Since the second arm portion 14 extends to a position under the grip portion 2, the second arm portion may be pivoted rearwardly beyond the grip portion 2 by bringing the forefinger 17 to the underside of the grip portion 2. Further, since the pivotal path of the second arm portion 14 is spaced from the underside of the grip portion 2 by a predetermined distance, the second arm portion does not interfere with the thumb and other fingers gripping the grip portion 2, thereby insuring smooth pivotal movement of the control arm 8 to the top speed position behind the grip portion 2.

The above manner of operation is only one example of how to operate the speed change lever assembly 5 of the first embodiment. Therefore, the positional relation and other parameters of the first and second arm portions 13, 14 may be easily altered depending on the size, movable range and so forth of the rider's fingers. For instance, the second arm portion 14 alone may be operated for directly pivoting the control arm 8 from the top speed position behind the grip portion 2 to the lowest speed position ahead of the grip portion 2. In such an instance, the first arm portion 13, because of its smaller length, does not interfere with the fingers gripping the grip portion 2, thereby insuring smooth speed change operation. Conversely, the first arm portion 13 alone may be operated for directly pivoting the control arm 8 from the lowest speed position ahead of the grip portion 2 to the top speed position behind the grip portion 2. In this case also, the second arm portion 14 does not interfere with the fingers gripping the grip portion 2, thereby insuring smooth speed change operation.

According to the first embodiment described above, the rider mainly uses the inwardly extended thumb 16 for pivotally operating the first arm portion, whereas the thumb 16 or forefinger 17 is downwardly extended for pivotally operating the second arm portion 14. Therefore, the operating relation between the fingers and the arm portions 13, 14 need not be fixed, and the rider can conveniently operate the control arm 8 by selecting a suitable finger and a suitable arm portion of the control arm depending on the pivotal position and the pivotal direction. As a result, the movable range of the thumb 16 and forefinger 17 can be effectively utilized for improvement of the operability as well as for enlargement in pivotal range of the control arm 8.

Further, the first arm portion 13 pivots in a region inwardly relative to the thumb 16 gripping the grip portion 2, while the second arm portion 14 pivots under the fingers gripping the grip portion. In other words, neither of the arm portions 13, 14 interferes with the fingers gripping the grip portion 2. Thus, the respective arm portions 13, 14 can pivotally move past the handlebar 1 and grip portion 2, so that the handlebar 1 or grip portion 2 does not provides a limiting position for the movable range of the respective arm portions 13, 14. Moreover, the movable range of the control arm is greatly increased, thereby increasing the number of speed stages.

Further, since the pivotal path of the second arm portion 14 is located clear of the fingers gripping the grip portion 2, the second arm portion may be extended to a position under the grip portion 2. As a result, the pivotal operability of the control arm 8 is greatly improved, and the pivotal range of the control arm is additionally increased.

As described above, with the speed change lever assembly according to the first embodiment, the speed change operability is greatly improved, and the pivotal range of the control arm 8 is greatly increased. Thus, as opposed to the conventional speed change lever assembly, the speed change lever assembly of the first embodiment can be adapted to a speed change mechanism having a large number of speed stages.

Next, a second embodiment of the present invention is described with reference to FIGS. 9 through 14.

Figure 9:
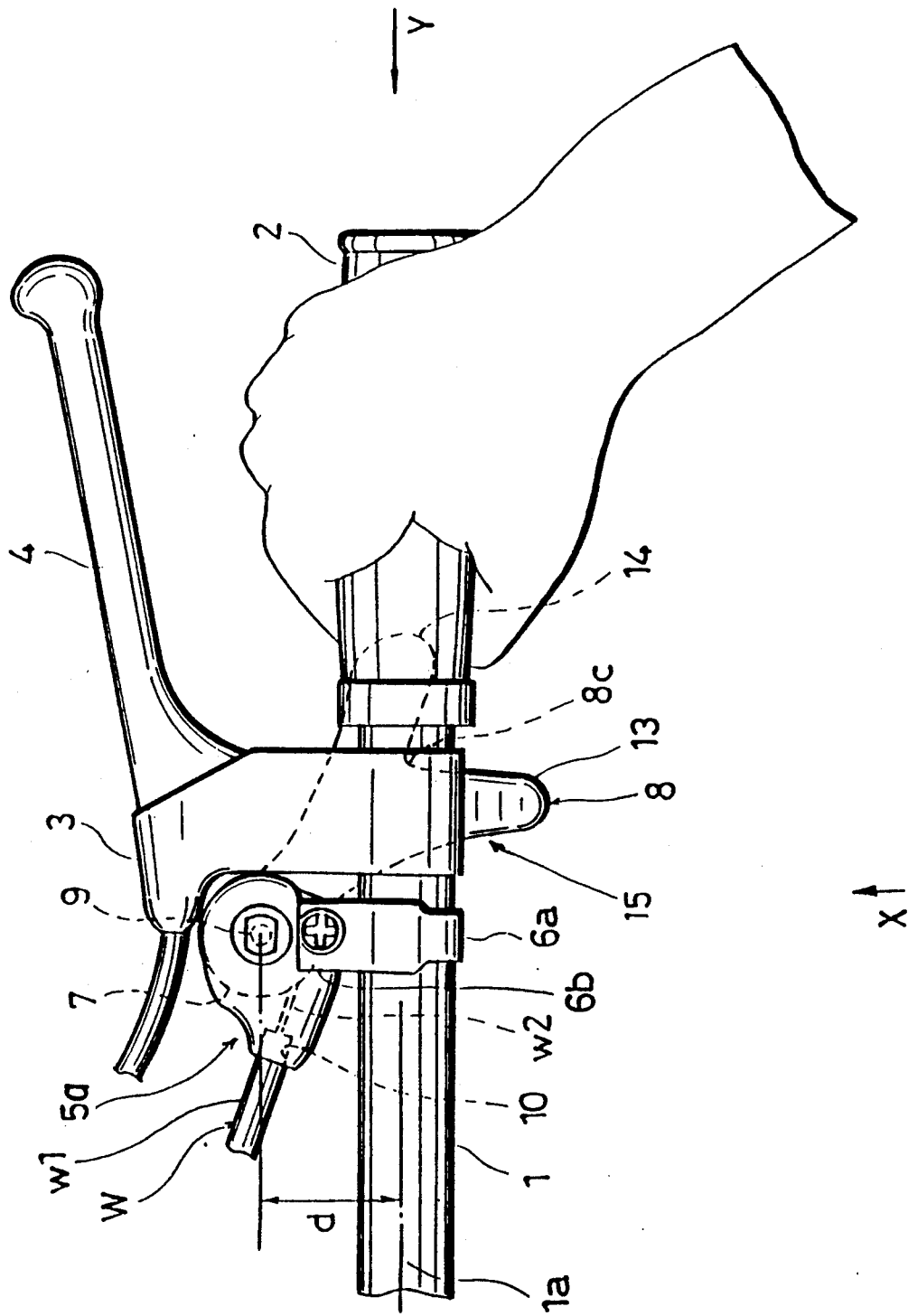
Figure 10:
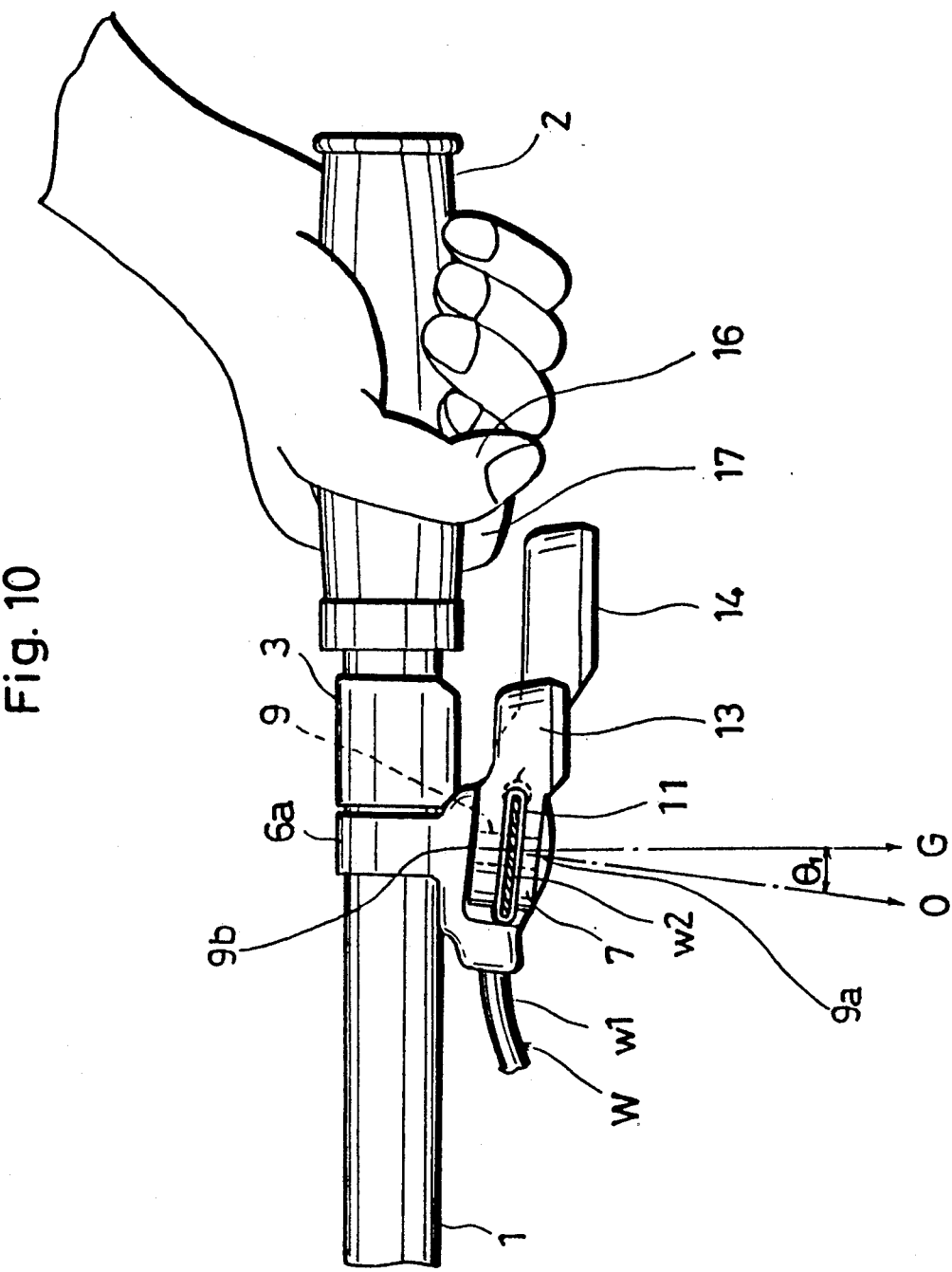
Figure 11:
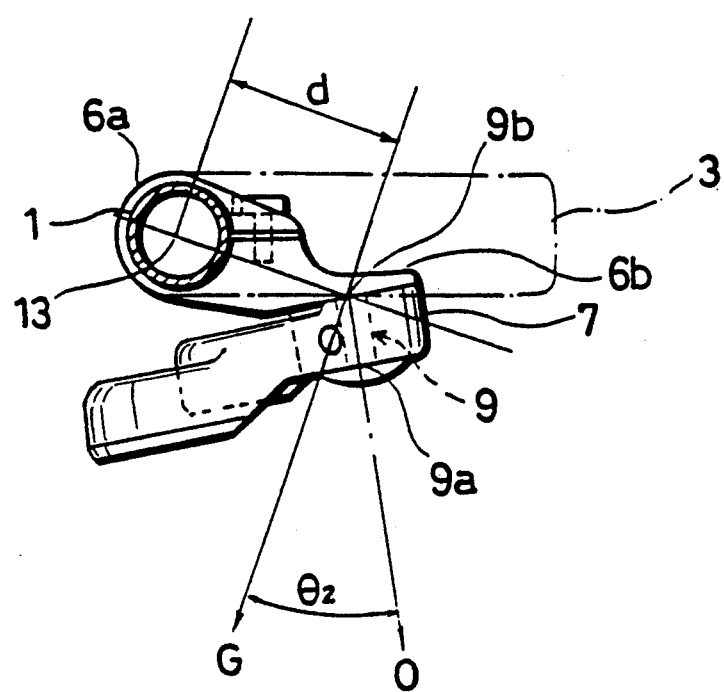

FIG. 9 is a plan view showing a speed change lever assembly 5a according to the second embodiment as mounted to the straight handlebar of a so-called mountain bicycle similarly to the first embodiment. FIG. 10 is a view showing the lever assembly 5a of FIG. 9 as seen from behind the bicycle (in the direction of an arrow X). FIG. 11 is a view showing the mounting condition of the lever assembly 5a as seen axially of the handlebar 1 (in the direction of an arrow Y).

Similarly to the first embodiment, the handlebar 1 is provided, at both ends, with grip portions 2 which are coated with soft resin for example. Inwardly relative to each grip portion 2 is arranged a brake bracket 3 projecting forwardly. A brake lever 4 extends ahead of the grip portion 2 and has its base portion pivoted to the brake bracket 3.

As shown in FIGS. 9-11, the speed change lever assembly 5a according to the second embodiment is mounted inwardly and downwardly relative to the brake bracket 3. The lever assembly mainly includes a mounting bracket 6a fixedly fitted on the handlebar 1, a tubular body 7 rotatably supported by the mounting bracket 6a, and a control arm 8 extending radially outward from the tubular body 7. In the second embodiment, the tubular body 7 is rotatably fitted on a lever shaft 9 which extends downward from the mounting bracket 6a. In this way, the control arm 8 together with the tubular body 7 is pivotally supported by the handlebar 1.

A control cable W extending from an unillustrated derailleur is connected to the speed change lever assembly 5a in the same manner as in the first embodiment.

As shown in FIG. 9, the control arm 8 according to the second embodiment has a Y-form in plan view by branching into a first operating arm portion 13 and a second operating arm portion 14, and the inner and outer side faces of the respective arm portions are adapted to be manually pushed for operation. Further, the control arm 8 may be pivoted in both directions by engaging either one of the thumb and forefinger with the crotch 8c between the respective arm portions 13, 14.

As better illustrated in FIG. 10, the first arm portion 13 is located inwardly relative to the finger portions engaging the underside of the grip portion 2 and provides a pivotal path immediately under the handlebar 1 or grip portion 2. Thus, the first arm portion may be pivotally operated within a horizontal plane which substantially contains the finger portions engaging the underside of the grip portion 2. On the other hand, the second arm portion 14 is located ahead of the first arm portion 13 and provides a pivotal path which is spaced from the underside of the grip portion 2 by a distance generally corresponding to the thickness of the finger portions engaging the underside of the grip portion, as shown in FIGS. 9 and 10.

The respective pivotal paths of the first and second arm portions 13, 14 differ from each other in the distance from the underside of the handlebar 1 or grip portion 2. Thus, similarly to the first embodiment, it is possible to obtain the advantages of improving the speed change operability and increasing the pivotal range of the control arm 8.

Further, according to the second embodiment, the mounting bracket 6a is provided with a forward extension 6b, so that the lever shaft 9 for the control arm 8 deviates forwardly by a distance d from the axis 1a of the handlebar 1.

The deviation of the lever shaft 9 of the control arm 8 forwardly from the handlebar 1 decreases the pivotal range of the control arm 8 behind the handlebar 1 on one hand but increases the pivotal range of the control arm 8 ahead of the handlebar 1. Therefore, it is possible to decrease the moving range of the thumb but increases that of the forefinger, so that the pivotal range of the control arm 8 is defined in corresponding relation to the movable ranges of the thumb and forefinger. As a result the respective movable ranges of the thumb and forefinger can be effectively utilized to enlarge the movable range of the control arm 8.

Figure 12:
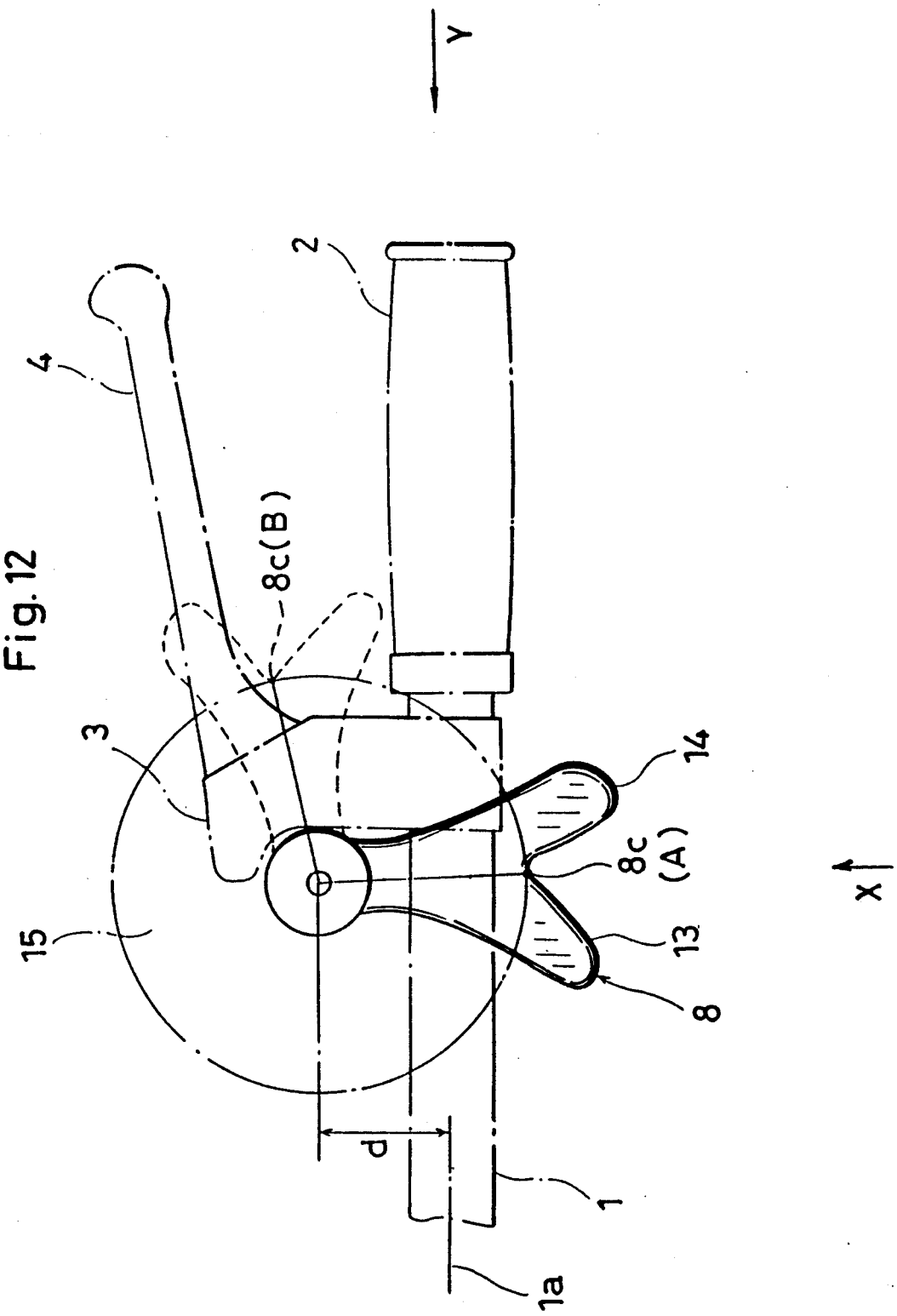

As schematically illustrated in FIG. 12, when the control arm 8 is brought to its rearward pivotal position, the projecting length of the control arm 8 behind the handlebar 1 decreases by the amount d. Therefore, it is unlikely that the free end portion of the control arm 8 is located too far rearwardly from the handlebar 1. Thus, the operability of the control arm 8 by the thumb is greatly improved, so that smooth speed change operation becomes possible.

Further, as shown in FIGS. 10 and 11, according to the second embodiment, the lever shaft 9 of the control arm 8 is inclined (in the direction of an arrow O) inwardly at an angle $\theta_1$ and forwardly at an angle $\theta_2$ relative to a straight line G which passes through the base end 9b of the lever shaft 9 and is perpendicular to the forward extension 6b of the mounting bracket 6a, so that the tip end 9a of the lever shaft deviates inwardly and forwardly. Due to such inclination of the lever shaft 9, the control arm 8 pivots in a plane which is inclined inwardly and forwardly relative to the forward extension 6b.

Figure 13:
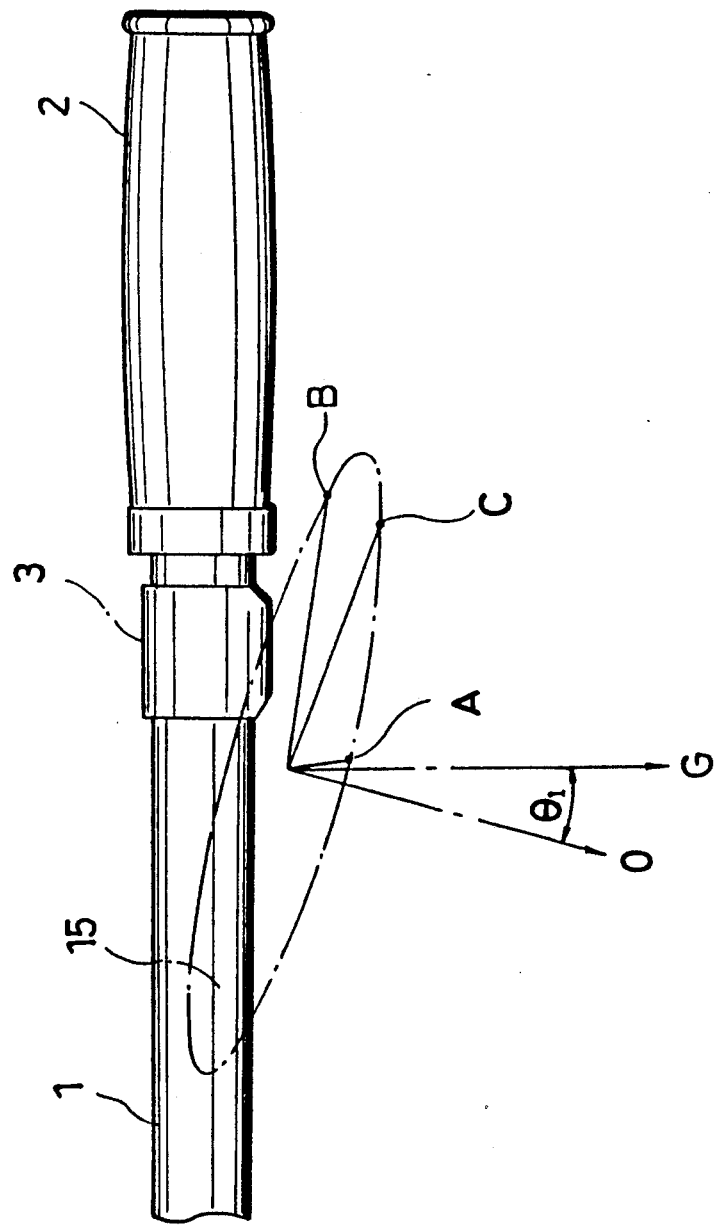
Figure 14:
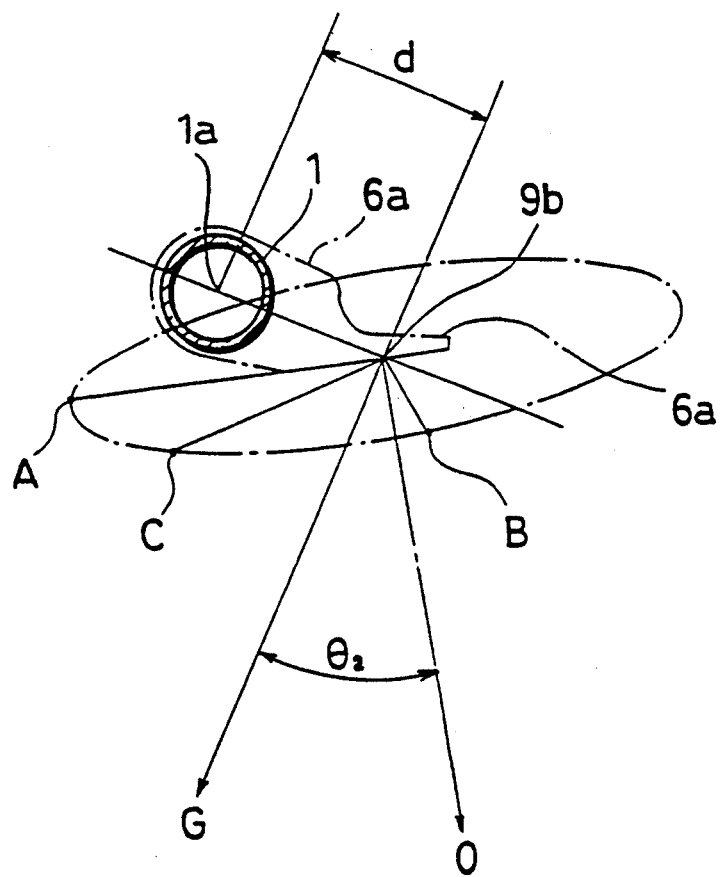

Description is made below with respect to the movement of the control arm 8 about the thus inclined lever shaft 9. FIGS. 12–14 schematically show the pivotal conditions of the control arm 8. FIG. 12 is a plan view, whereas FIG. 13 is a schematic view showing the movement of the control arm 8 as seen in the arrow X direction in FIG. 12. FIG. 14 is a schematic view showing the movement of the control arm 8 as seen in the arrow Y direction in FIG. 12. In these drawings, the pivotal path of the crotch 8c between the respective arm portions 13, 14 of the control arm 8 is shown for representing the pivotal path of the control arm 8 itself.

As shown in these drawings, the control arm 8 pivots in a plane which is inclined relative to the forward extension 6b of the mounting bracket 6a. Due to this inclination, relative to the horizontal plane, of the pivotal plane 15 for the control arm 8, the pivotal path of the control arm 8 is ellipsoidal with a high degree of oblateness when seen from behind (in the arrow X direction) and laterally inward (in the arrow Y direction).

According to the second embodiment, the control arm 8 is designed to pivot in an angular range of about 90° between a pivotal position A in which the control arm 8 is directed rearwardly and another pivotal position B in which the control arm 8 is directed laterally outward. In this angular range, the position of the control arm 8 varies relative to the handlebar 1 both horizontally and vertically when the control arm 8 is pivotally operated. Specifically, since the lever shaft 9 of the control arm 8 is inclined as above, the vertical position of the control arm 8 becomes lowest when the control arm 8 assumes a position C in which it is obliquely directed outwardly and rearwardly, as shown in FIGS. 13 and 14. On the other hand, when the control arm 8 assumes the rearwardly directed position A and the outwardly directed position B, the control arm 8 is located above the lowest position C. Thus, the control arm 8 becomes vertically closest to the handlebar 2 or grip portion 2 at the two terminal positions in the pivotal range of the control arm.

As a result, the control arm 8 comes near the thumb or forefinger gripping the grip portion 2 at the two terminal positions A, B where it is difficult to pivotally operate the control arm 8 by these fingers, thereby improving the operability. Further, at an intermediate portion where it is easier to pivotally operate the control arm 8 by the thumb or forefinger, the control arm 8 pivotally moves under and away from the handlebar 1 or grip portion 2 with less likelihood of interfering with the fingers gripping the grip portion 2, so that the operability of the control arm 8 is additionally improved.

With the arrangement described above, the first arm portion 13 is mainly operated by the rider's thumb 16 extended inwardly, whereas the second arm portion 14 is pivotally operated by the thumb 16 or forefinger 17 extended downwardly. Therefore, no fixed relation is needed between the pushing fingers and the control arm 8, and the rider can conveniently operate the control arm 8 by selecting a suitable operating position depending on the pivotal position and the pivotal direction. As a result, the movable range of the thumb 16 and forefinger 17 can be effectively utilized for improvement of the operability as well us for enlargement in pivotal range of the control arm 8.

Further, the first arm portion 13 pivots inwardly relative to the thumb gripping the grip portion 2 even directly under the handlebar, while the second arm portion 14 pivots under the fingers gripping the grip portion. In other words, neither of the arm portions 13, 14 interferes with the fingers not used for operating the control arm. Thus, the handlebar 1 or grip portion 2 does not provides a limiting position for the movable range of the respective arm portions 13, 14, so that the movable range of the control arm and the number of speed stages are greatly increased.

As described above, with the speed change lever assembly according to the second embodiment, the speed change operability is greatly improved, and the pivotal range of the control arm 8 is greatly increased. Thus, as opposed to the conventional speed change lever assembly, the speed change lever assembly of the first embodiment can be adapted to a speed change mechanism having a large number of speed stages.

Further, with the speed change lever assembly according to the present invention, speed change operation can be performed while gripping the grip portion 2. Thus, the running safety at the time of performing speed change can be greatly improved.

The present invention is not limited to the specific embodiment described above. While, in these embodiments, the present invention is applied to the speed change lever assembly 5, 5a arranged at the right-hand side of the handlebar, they may be arranged at the left-hand side of the handlebar.

Further, in the embodiments, the control arm 8 is pivotally operated in a typical manner. However, various manners of operation are possible depending on the rider's finger size, the number of speed stages and so forth.

Further, in the embodiments, the second arm portion 14 is located ahead of and at a suitable angle relative to the first arm portion 13. However, a larger angle or no angle may be set between the arm portions.

Further, the lever shaft 9 of the speed change lever assembly is provided on the mounting bracket 6, 6a arranged separately from the brake bracket 3. However, the lever shaft 9 may be provided on the brake bracket 3.

Further, the inclination of the lever shaft 9 for the control arm 8 shown for the second embodiment need not be provided.

Further, the shape, length and etc. of the control arm 8 may be modified.

Moreover, the pivotal range of the control arm 8 is not limited to that shown for the specific embodiments.

What is claimed is:

1. A bicycle speed change lever assembly comprising a lever shaft extending downwardly at a position inwardly from an end grip of a handlebar, and a control arm pivotally supported on and extending radially outward from the lever shaft, wherein the control arm has first and second operating arm portions which are integrally connected for pivotal movement solely about the lever shaft, the first operating arm providing a first pivotal path located vertically closer to the handlebar, the second operating arm portion having a second pivotal path located vertically farther from the handlebar.

2. The lever assembly according to claim 1, wherein the second operating arm portion is longer than the first operating arm portion.

3. The lever assembly according to claim 2, wherein the second operating arm portion is positioned ahead of the first operating arm portion.

4. The lever assembly according to claim 2, wherein the second pivotal path horizontally overlaps a finger engaging portion of the end grip, the first pivotal path being located clear of the finger engaging portion of the end grip.

5. The lever assembly according to claim 1, wherein the first and second operating arm portions branch in a Y-form in plan view.

6. The lever assembly according to claim 1, wherein the lever shaft extends downward from a mounting bracket which is attached to the handlebar near the end grip.

7. The lever assembly according to claim 1, wherein the mounting bracket has a forward extension for mounting the lever shaft at a position completely ahead of the handlebar.

8. The lever assembly according to claim 7, wherein the second operating arm portion is positioned ahead of the first operating arm portion.

9. The lever assembly according to claim 7, wherein the second pivotal path horizontally overlaps a finger engaging portion of the end grip.

10. The lever assembly according to claim 7, wherein the first and second operating arm portions branch in a Y-form in plan view.

11. A bicycle speed change lever assembly comprising a lever shaft mounted at a position inwardly from an end grip of a handlebar, and a control arm pivotally supported on and extending radially outward from the lever shaft, wherein the control arm has first and second operating arm portions which are integrally pivotable solely about the lever shaft, each of the first and second operating arm portions having an upper surface and a lower surface, the upper surface of the second operating arm portion being located vertically farther from the handlebar than that of the first operating arm portion, the lower surface of the second operating arm portion being also located vertically farther from the handlebar than that of the first operating arm portion.

12. The lever assembly according to claim 11, wherein the second operating arm portion is longer than the first operating arm portion.

13. The lever assembly according to claim 12, wherein the second operating arm portion is positioned ahead of the first operating arm portion.

14. The lever assembly according to claim 12, wherein the second pivotal path horizontally overlaps a finger engaging portion of the end grip, the first pivotal path being located clear of the finger engaging portion of the end grip.

15. The lever assembly according to claim 11, wherein the first and second operating arm portions branch in a Y-form in plan view.

16. The lever assembly according to claim 11, wherein the lever shaft extends from a mounting bracket which is attached to the handlebar near the end grip.

17. The lever assembly according to claim 11, wherein the mounting bracket has a forward extension for mounting the lever shaft at a position completely ahead of the handlebar.

18. The lever assembly according to claim 17, wherein the second operating arm portion is positioned ahead of the first operating arm portion.

19. The lever assembly according to claim 17, wherein the second pivotal path horizontally overlaps a finger engaging portion of the end grip.

20. The lever assembly according to claim 17, wherein the first and second operating arm portions branch in a Y-form in plan view.

* * * * *